UNITED STATES PATENT OFFICE 2,598,667

PTEROIC ACIDS AND PROCESS OF PREPARING SAME

Coy W. Waller and John H. Mowat, Pearl River, N. Y., assignors to American Cyanamid Company, New York, N. Y., a corporation of Maine No Drawing. Original application July 23, 1945, Serial No. 606,704. Divided and this application April 12, 1947, Serial No. 741,003

11 Claims. (Cl. 260—251.5)

This invention relates to organic compounds possessing biological activity and other useful properties and to processes of preparing the same. This application is a division of our co-pending application, Serial No. 606,704, filed July 23, 1945, now Patent No. 2,500,396.

We have discovered that new organic compounds may be prepared by the reaction of 2,4,5-triamino-6-hydroxypyrimidine, an alpha, beta-dihalo-propionaldehyde and aminobenzoic acid, and salts and esters thereof. The reaction may be illustrated by the following equation:

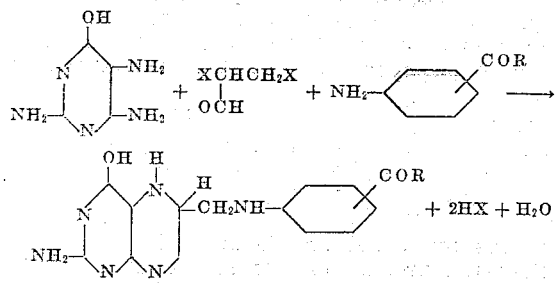

in which X is a halogen and R is —OH or —OR′, R′ being an alkyl radical. Two hydrogen atoms of the pyrazyl ring of the illustrated product or one of its tautomeric or resonant forms, as the case may be, are removed, by oxidation or otherwise, to yield the following compounds:

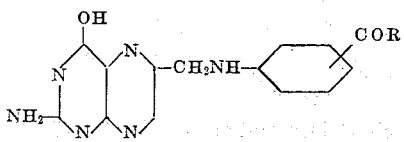

Acid salts of these compounds may be prepared by treatment with strong mineral acids, such as hydrochloric, sulfuric, and the like. Salts with cations may also be obtained by treatment of the compounds with a suitable alkali, such as an alkali metal hydroxide, ammonia, an amine, or the like. Other metal salts of cations such as zinc, silver, nickel, copper, magnesium, barium, and the like may be obtained therefrom by double decomposition methods, for example by treating a solution of an alkali metal salt of the compound with a soluble salt of the desired cation.

Generally speaking, the compounds of the present invention are yellow to reddish-brown crystalline solids, difficulty soluble in water and organic solvents. Some possess vitamin-like properties and appear to be necessary for, or stimulate the growth of, certain bacteria and higher forms of animal life. Other compounds in the series possess properties which make them of value in still other ways.

Of the reactants, 2,4,5-triamino-6-hydroxy-pyrimidine is a known compound and may be prepared by methods which have been described in the chemical literature. As is also well known, this compound may exist in one or more tautomeric forms, such as:

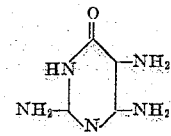

The latter is known as 2,4,5-triaminopyrimidone-6. Whether or not the compound exists in the keto form or the enol form probably depends upon the pH of the medium in which the compound is dissolved. In acid media the compound most likely exists in keto form whereas in alkaline media it exists as the enol form. As will be understood by those in the art, either of the tautomeric forms may be used in the same chemical reactions in like manner and reference hereinafter to the use of one tautomeric form includes the use of the others.

The preferred alpha, beta-dihalopropionaldehyde is alpha, beta-dibromopropionaldehyde, although, as illustrated in the specific examples, other dihalogenated propionaldehydes may be used. It will also be noted that acetals of dihalopropionaldehydes may also be used in the reaction. As an equilibrium exists between the free aldehyde and its acetal in solution, it is believed that the actual reactant is the aldehyde itself. Accordingly, when reference is made hereinafter, and in the claims, to the use of a dihalopropionaldehyde, such reference is intended to include the equivalent use of the corresponding dihalopropionaldehyde acetals.

The aminobenzoyl reactants include any ortho, meta, or paraaminobenzoic acid, and salts, esters, and other related derivatives thereof. The biological activity of the resulting product depends, in large measure, upon the particular aminobenzoyl compound employed in the reaction. For example, when p-aminobenzoic acid or its salts are used, the resulting product is biologically active as an essential growth factor for Streptococcus fecalis R but is, however, inactive with certain other organisms for which other compounds of the invention show activity.

The compounds that are formed when using esters of p-aminobenzoic acid, such as the methyl, ethyl, butyl, benzyl, and the like, esters, do not appear to possess the same biological activity, being ineffective in promoting the growth of *Streptococcus fecalis* R and certain other organisms with which these compounds have been tested at the present time. It is possible, however, that these particular compounds may be of value in experimental medicine in other ways.

The reaction may be conducted by mixing all of the three essential reactants together at the same time or the dihalopropionaldehyde may be first reacted with one of the other two reactants before adding the third to the reaction mixture.

The reaction may take place over a wide range of temperatures, from 2° or 3° C. up to 100° C. or higher. Likewise, the reaction will take place under a wide range of pH conditions, there appearing to be no limiting acidity or alkalinity. Best results appear to be obtained, however, within the range of pH 3 to pH 5.

The reaction is usually conducted with the reactants dissolved or suspended in a solvent such as water, ethyl alcohol, acetone, benzene, carbontetrachloride, chloroform, etc. or mixtures thereof.

As previously noted, the first product of the reaction appears to be an unstable dihydro form and, in the presence of oxidizing agents, two hydrogen atoms from the pyrazine nucleus are split out to form the aromatic form of the product. Simple exposure of the product to the air will bring about this oxidation in a short time. Other oxidizing agents, such as elemental iodine, will produce the same result and it may be of advantage to use such oxidizing agents under some conditions. The use of oxidizing agents of this type, however, is not a part of the present invention and forms the subject matter of an application by Donna B. Cosulich, Serial No. 689,821, filed August 10, 1946, now abandoned.

The invention will now be described in greater particularity by means of the following examples in which various reaction conditions and reactants are shown. It will be understood, of course, that the invention is not limited to the particular details of these examples since other reaction conditions and reactants within the skill of the art may be employed to produce new and useful compounds falling within the scope of the present invention. All parts are by weight unless otherwise indicated.

*Example 1*

One part by weight of 2,4,5-triamino-6-hydroxypyrimidine and 1.0 part of p-aminobenzoic acid were dissolved in 100 parts by volume of water. The solution was filtered and cooled to room temperature. The solution was then adjusted to a pH of 4 and kept at this value during the remaining part of the reaction by the addition of acid or alkali as necessary. To the solution was added 1.6 parts of alpha,beta-dibromopropionaldehyde in 50 parts by volume of ethyl alcohol. After one hour at room temperature the solution was filtered and the precipitated product was washed and dried. The product obtained had the following structure:

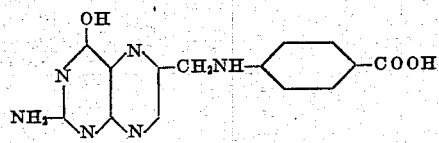

The product was obtained in the form of light yellow crystals. When examined microscopically the crystal phase presented gave only a centered optic axis figure with 2V nearly 90°. Beta (β) was found to be 1,720±0.005. The particular crystals examined were thin and diamond shaped and showed symmetrical extinction with some residual slight blue-gray transmission at the extinction position. The crystals decomposed, when heated, without melting.

The free acid is insoluble in aqueous solutions of strong acids and is extremely insoluble at a pH of about 3; but may be recrystallized from 3N hydrochloric acid. It is soluble in aqueous solutions of bases with the formation of a monobasic or dibasic salt depending on the concentration and strength of base used.

The acid salts of the compound are obtained by treatment of the product with strong acids. The hydrochloride was prepared and had a refractive index parallel to the width of the crystals of 1.86±0.01 and a refractive index parallel to the length of the crystals of 1.459±0.003. The particular crystals examined were found to have a tiny columnar form, 10 to 20μ long and 1μ wide.

The compound of this example was found to be an essential growth factor for *Streptococcus fecalis* R, but not for *Lactobacillus casei*. It did not promote the growth of chicks or the formation of haemoglobin.

*Example 2*

The procedure of Example 1 was repeated using in place of p-aminobenzoic acid an equivalent amount of ethyl p-aminobenzoate. The resulting compound had the following structure:

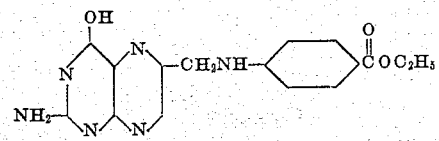

This compound was found to be less active than the product of Example 1 as a growth factor under the conditions of the test when tested against *Streptococcus fecalis* R.

We claim:
1. Compounds selected from the group consisting of those having the general formula

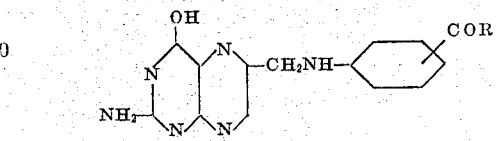

in which R is a radical of the group consisting of OH and OR', R' being an alkyl radical, and the salts of such compounds.

2. A compound having the formula

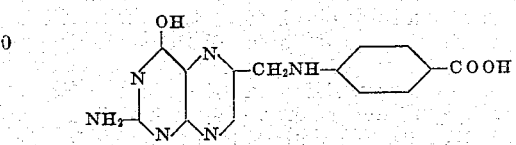

3. The metal salts of the compound of claim 2.
4. A compound having the formula

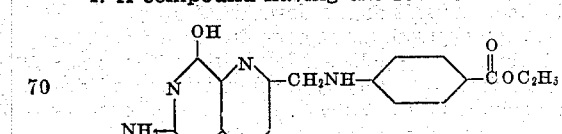

5. A method which comprises mixing together 2,4,5-triamino-6-hydroxypyrimidine, alpha, beta-dihalopropionaldehyde, and in aromatic amine of the group consisting of aminobenzoic acid, its salts and its esters, and after reaction thereof recovering a compound having the formula

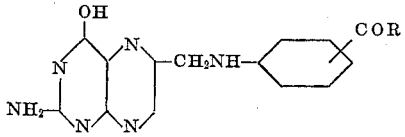

in which R is a radical of the group consisting of —OH, —OMe, and —OR', R' being an alkyl radical and Me being a cationic salt forming radical.

6. A method which comprises mixing together in an inert solvent at a pH within the range 3 to 5, 2,4,5 - triamino - 6 - hydroxypyrimidine, alpha, beta-dihalopropionaldehyde and an aromatic amine of the group consisting of aminobenzoic acid, its salts and its esters and after reaction thereof recovering a compound having the formula

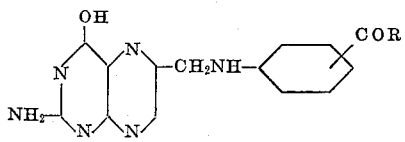

in which R is a radical of the group consisting of —OH, —OMe, and —OR', R' being an alkyl radical and Me being a cationic salt forming radical.

7. A method which comprises mixing together 2,4,5-triamino-6-hydroxypyrimidine, alpha,beta-dibromopropionaldehyde and an aromatic amine of the group consisting of aminobenzoic acid, its salts and its esters, and after reaction thereof recovering a compound having the formula

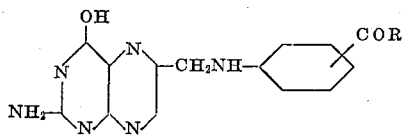

in which R is a radical of the group consisting of —OH, —OMe, and —OR', R' being an alkyl radical and Me being a cationic salt forming radical.

8. A method which comprises mixing together 2,4,5-triamino-6-hydroxypyrimidine, alpha, beta-dichloropropionaldehyde and an aromatic amine of the group consisting of aminobenzoic acid, its salts and its esters, and after reaction thereof recovering a compound having the formula

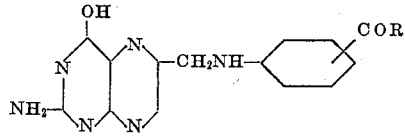

in which R is a radical of the group consisting of —OH, —OMe, and —OR', R' being an alkyl radical and Me being a cationic salt forming radical.

9. A method which comprises mixing together in an aqueous solvent and a hydrogen ion concentration within the range of pH 3 to pH 5 2,4,5-triamino-6-hydroxypyrimidine, alpha, beta-dibromopropionaldehyde, and p-aminobenzoic acid and after reaction thereof recovering a compound having the formula

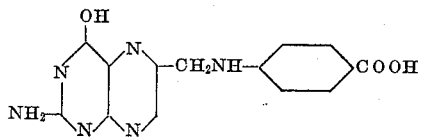

10. A compound selected from the class consisting of those having the following structure:

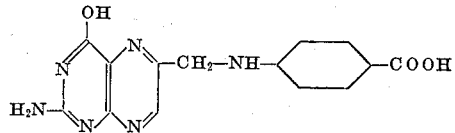

and the alkali metal salts thereof.

11. Hydrohalide salts of the compound having the formula:

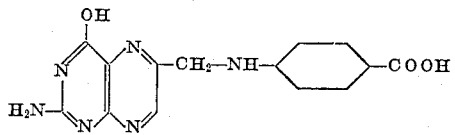

COY W. WALLER.
JOHN H. MOWAT.

REFERENCES CITED

The following references are of record in the file of this patent:

Angier et al., Science (No. 2683), 103, 667–669 (1946).